Feb. 10, 1970         I. BRODIE                3,495,267
            ELECTROGRAPHIC OSCILLOSCOPE CAMERA EMPLOYING
                    A PULSED GRATICULE ILLUMINATOR
Filed March 3, 1967                              2 Sheets-Sheet 1
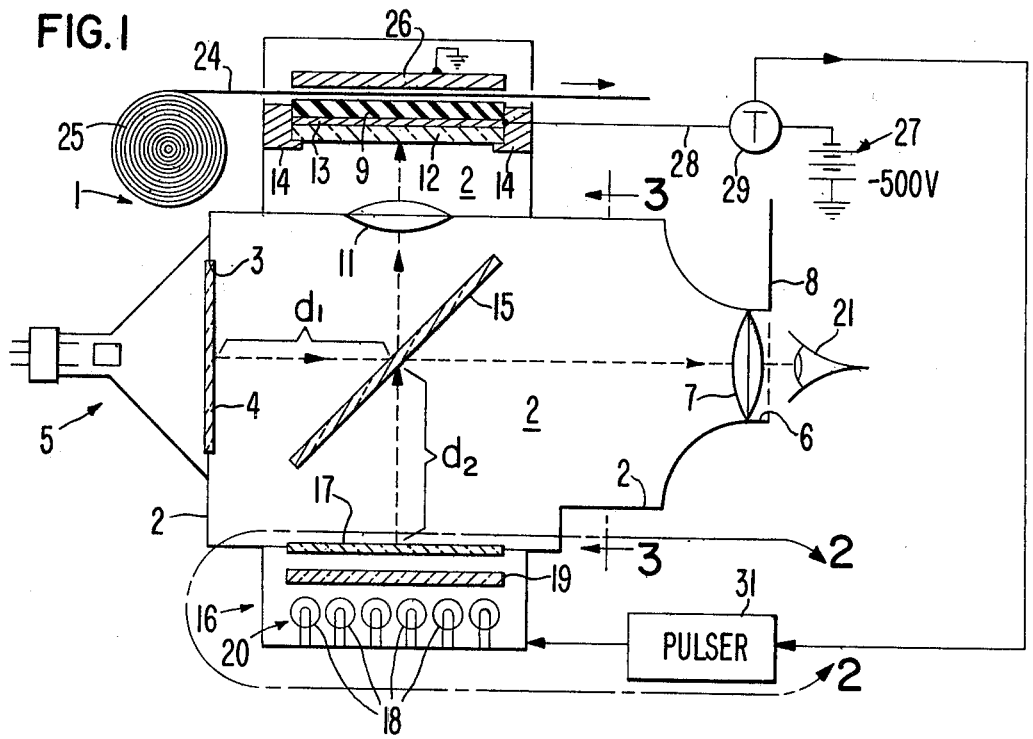
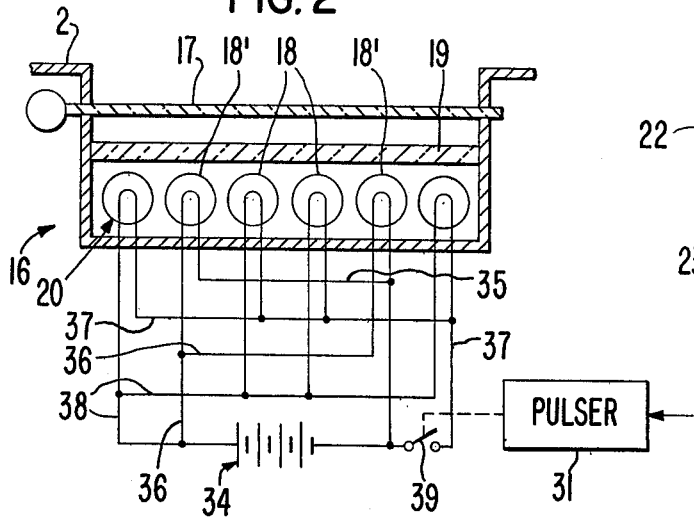
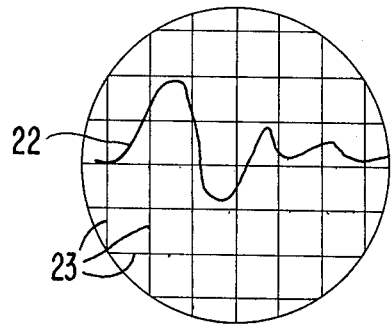
FIG. 3
INVENTOR.
IVOR BRODIE
BY
ATTORNEY

# United States Patent Office 3,495,267
Patented Feb. 10, 1970

3,495,267
ELECTROGRAPHIC OSCILLOSCOPE CAMERA EMPLOYING A PULSED GRATICULE ILLUMINATOR
Ivor Brodie, Palo Alto, Calif., assignor to Varian Associates, Palo Alto, Calif., a corporation of California
Filed Mar. 3, 1967, Ser. No. 620,436
Int. Cl. G01d 9/42
U.S. Cl. 346—23      7 Claims

ABSTRACT OF THE DISCLOSURE

Electrophotographic oscilloscope cameras are disclosed for recording oscilloscope traces on electrographic recording paper. The cameras comprise a dark box containing a partially transmissive mirror for superimposing the photon images of the oscilloscope trace and a separately projected graticule scale upon a photoconductive plate, as a selenium. A sheet of electrographic recording paper is positioned overlaying the photoconductive plate. A potential is applied across the photoconductive plate and electrographic paper to cause a charge image to be deposited upon the electrographic recording paper in accordance with the photon images. The change image is subsequently developed by conventional methods employing a liquid or dry electrographic toner. The partially transmissive mirror also projects the superimposed oscilloscope trace and graticule photon images to an observation port. The graticule illumination is provided with two levels of intensity. A first level of graticule illumination intensity is provided during the time the oscilloscope image is being observed with the eye. A pulser pulses the graticule illumination intensity to a higher level during the time the charge image is being formed on the electrographic paper (exposure time) such that the graticule image will not be under exposed on the electrographic recording paper.

DESCRIPTION OF THE PRIOR ART

Electrographic oscilloscope cameras have been built for recording oscilloscope traces on electrograph recording paper. In these prior cameras, the camera included a partially transmissive mirror for superimposing the photon images of the oscilloscope trace and the separately projected graticule scale upon a photoconductive member for forming an electric charge image upon a recording medium under the influence of an applied potential. The charge image on the recording medium was subsequently developed by conventional electrographic toner development methods. The partially transmissive mirror also provided means for superimposing the graticule and oscilloscope trace images for observation by eye.

One problem with this prior arrangement was that the level of intensity of the graticule illumination was purposely set lower than the level of intensity of the illumination obtained from the oscilloscope trace for ease of observation by eye. This produces a problem when the scope trace is photographed because the proper exposure time for the graticule image is therefore much longer than that required for the oscilloscope trace. Moreover, when selenium was used as the photoconductive member it tended to compound the problem because selenium is more sensitive to the wavelength of light emitted from the phosphors of the ocilloscope screen than to the wavelength of the incandescent lamps used to illuminate the graticule. As a result, the proper exposure time for a repetitive oscilloscope trace was 0.5 second at F 1.9 while an exposure time of 10 seconds at F 1.9 was required for the graticule image. It is desired to reduce the exposure time to that time required for the repetitive oscilloscope trace without increasing the intensity of the graticule illumination during observation periods.

SUMMARY OF THE PRESENT INVENTION

The principal object of the present invention is the provision of an improved electrophotographic oscilloscope camera.

One feature of the present invention is the provision in an electrophotographic oscilloscope camera of means for pulsing the intensity of the graticule illumination from a normal intensity to a substantially higher level of intensity during the exposure time, whereby the graticule is not under exposed on the electrographic recording medium or film.

Another feature of the present invention is the same as the preceding feature wherein the pulser is actuated from the timer which controls the exposure time.

Other features and advantages of the present invention will become apparent upon a perusal of the following specification taken in connection with the accompanying drawings wherein:

BRIEF DESCRIPTION OF THE DRAWINGS

FIG. 1 is a schematic longitudinal section view of an electrophotographic oscilloscope camera embodying features of the present invention, FIG. 2 is an enlarged schematic diagram of a portion of the structure of FIG. 1 delineated by line 2—2.

FIG. 3 is a negative image of the oscilloscope trace and graticule images as seen by taking a view along line 3—3 of FIG. 1 in the direction of the arrows.

DESCRIPTION OF THE PREFERRED EMBODIMENTS

Figure 4:
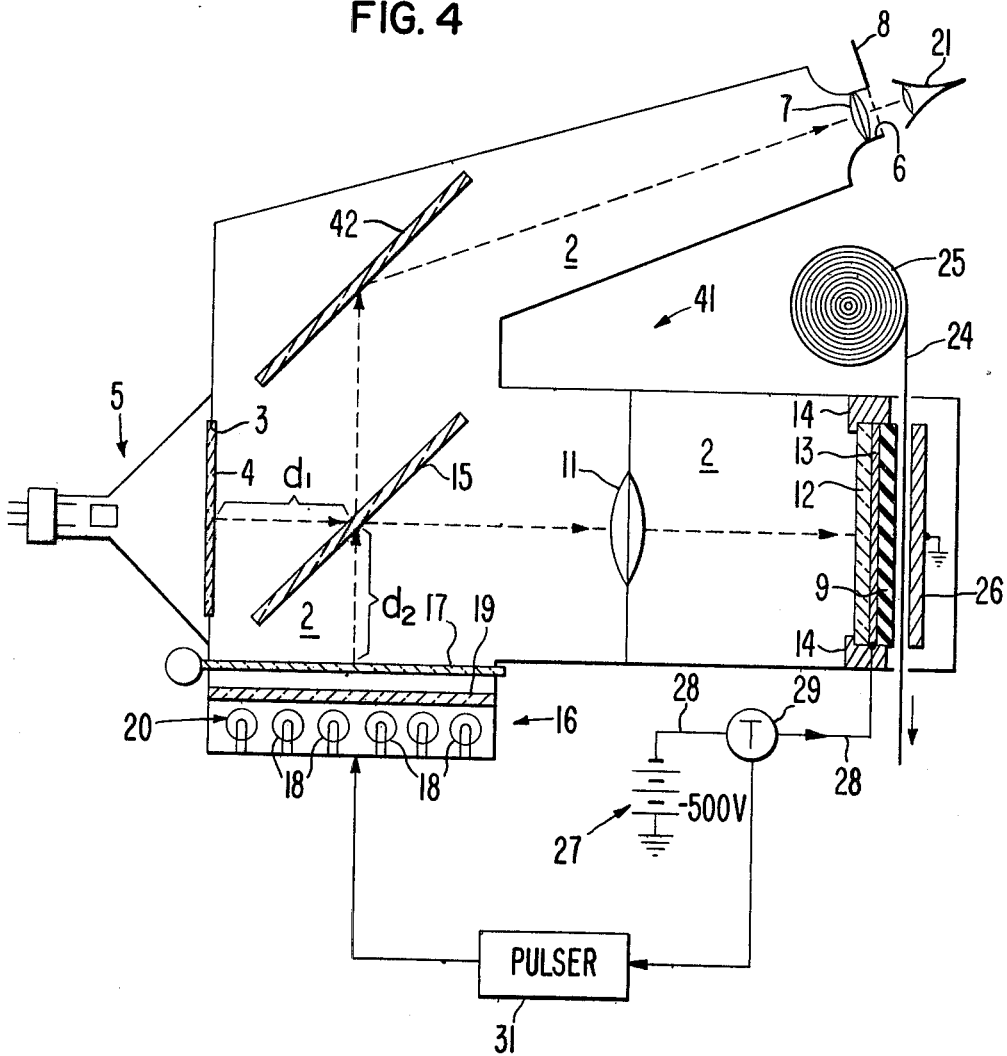
FIG. 4 is a schematic, longitudinal sectional view of an alternative electrophotographic oscilloscope camera embodying features of the present invention.

Referring now to FIG. 1, there is shown the electrophotographic oscilloscope camera 1 of the present invention. The camera 1 contains a dark box 2 having an opening 3 in one end wall to receive the screen 4 of an oscilloscope 5. A viewing portion 6 is provided in the opposite end wall of the dark box 2. A window 7 and shutter 8 are provided at the viewing port 6. A photoconductive plate 9 is mounted in the focal plane of a lens 11 in the side wall of the dark box 2. The photoconductive plate 9 is carried from a transparent glass plate 12 via the intermediary of an optically transparent conductive electrode 13. The photoconductive plate 9, conductive electrode 13 and glass plate 12 are cemented to a lip portion 14 of the dark box 2.

A partially optically transmissive mirror 15 is positioned with its planar surface at 45° to the line of sight path between the observation port 6 and the screen 4 to project the photon image of the oscilloscope trace through the lens 11 onto the photoconductive plate 9. A graticule scale projector 16 is positioned in the opposite side wall of the dark box 2 from the photoconductive plate 9.

The graticule projector 16 comprises a photographic slide 17 of the graticule scale image. The slide 17 is illuminated by a plurality of incandescent lamps 18 forming a light source 20. A light diffusing plate 19 is positioned between the lamps 18 and the slide 17 for diffusing the light projected through the graticule slide projector 16. A portion of the graticule image is reflected from the center of the partially transmissive mirror 15 which distance $d_2$ is also equal to the distance $d_1$ from the center of the mirror 15 to the oscilloscope screen 4. In this manner, the oscilloscope trace image and the graticule image are both in focus on the photoconductive plate 9.

The graticule image is projected through the partially transmissive mirror 15 to the photoconductive plate 9.

A portion of the graticule image is reflected form the mirror 15 to the observer 21 such that the observer 21 sees the oscilloscope trace with the graticule scale image superimposed thereon, as indicated in FIG. 3 where 22 is the oscilloscope trace and 23 is the graticule scale image. However, it will be appreciated that FIG. 3 is a negative image of the image as actually observed.

A strip of electrographic recording paper 24 is positioned overlying the photoconductive plate 9. The paper strip is supplied from a roll 25 and may be pulled through the camera 1 by hand or by any suitable device such as a motor driven friction wheel, not shown. The electrographic recording paper 24 comprises a conductive paper backing which supports a thin dielectric film coating, as of 4 microns thick, on one side of the paper. The dielectric coating forms a charge retentive surface of the paper 24. The paper is positioned with the charge retentive surface in nominal contact with the photoconductive plate 9 and with the conductive backing in electrical contact with a conductive pressure plate 26.

A source of potential 27, as of —500 v., is connected via lead 28 to the transparent electrode 13. A timer switch 29 is connected in the lead 28 for controlling the duration of the time during which the potential is applied to the electrode 13. The positive terminal of the potential source 27 is connected to the pressure plate 28 via ground such that the potential of source 27 is connected across the photoconductive plate 9 and charge retentive film of the paper 24 through the timer 29.

The timer 29 also controls the operating time of pulser 31. The pulser 31 serves to switch the intensity of the projector light source 20 from a first intensity to a substantially higher intensity, as of 20 times higher, during the time the timer 29 applies the potential from source 27 across the photoconductive plate 9 and paper 24 (exposure time).

In operation, the observer 21 observes the superimposed oscilloscope trace and graticule images at port 6. When he has adjusted the oscilloscope 5 to produce a repetitive trace which he desires to record, the shutter 8 is closed to eliminate unwanted light which may otherwise enter from the viewing port 6. The timer 29 is then actuated to apply the potential from source 27 across the photoconductive plate 9 and recording paper 24. In addition, the timer 29 sends a signal to the pulser 31 which switches the intensity of the projected graticule image to a much higher intensity to produce a more nearly equal exposure of the graticule and of the oscilloscope trace during the exposure time.

The photoconductive plate 9, with the photon images focused thereon, is conductive in a pattern corresponding to the photon images illuminating same. Thus, during the exposure time, the photoconductive image pattern permits substantially the full potential, as of —400 v., of source 27 to be applied across the dielectric charge retentive surface of the paper 24 and the minute air-gap, on the order of a few microns, between the charge retentive layer and the photoconductive plate 9. This applied potential causes a charge image, in accordance with the photon images, to be deposited upon the charge retentive layer of the paper 24.

The charge image is subsequently developed on the recording paper by conventional electrographic development methods employing electrographic toner. The developed image is as shown in FIG. 3. After the exposure time, a length of the paper 24 containing the charge image is merely pulled from the camera 1 for development. In this step, an unexposed portion of the paper is positioned overlaying the photoconductive plate 9. A typical exposure time employing a selenium photoconductive plate 9 is 0.5 second.

Referring now to FIG. 2, there is shown the graticule projector 16 in greater detail. The light source 20 includes a plurality of incandescent bulbs 18. A small fraction of the total number of bulbs 18 in the source 20 such as bulbs 18' are connected in parallel with a power source 34 via leads 35 and 36. A substantially higher number of bulbs 18, such as 20 times as many bulbs 18, are connected in parallel with the source 34 via leads 37 and 38 and switch 39. While the oscilloscope trace is being observed by the observer 21, switch 39 is open such that the graticule is illuminated by only the light from bulbs 18'. However, when the timer 29 starts the exposure time, it sends a signal to the pulser 31 which closes the switch 39 and energizes all the bulbs thereby greatly increasing the intensity of the graticule illumination during the exposure time. When the exposure time is over, the pulser 31 opens switch 39 thereby returning the level of graticule illumination to the lower intensity level as desired for observation by observer 21 and, thus, reducing the heat generated by the graticule illuminator.

Referring now to FIG. 4, there is shown an alternative electrophotographic oscilloscope camera 41 embodying features of the present invention. In this embodiment, the structure is essentially identical to that of FIGS. 1 and 2 except that the viewing and recording positions are reversed such that the camera 41 records a non-reflected image of the oscilloscope while the observer views a reflected image of the oscilloscope trace. More specifically, the photoconductive plate 9 is positioned in the end wall of the dark box 2 which is opposite to the oscilloscope screen 4. The lens 11 picks up the photon image of the oscilloscope trace which is transmitted through the 45° mirror 15. The lens 11 focuses the trace image upon the photoconductive plate 9 together with the graticule image as reflected from the mirror 15. The oscilloscope image, as reflected from the mirror 15, is reflected from a second mirror 42 to the viewing port 6. The second mirror 42 is fully reflective. The graticule image is transmitted through the first mirror 15 to the second mirror 42 and thence to the viewing port 6. The second mirror 42 is fully reflective. The graticule image is transmitted through the first mirror 15 to the second mirror 42 and thence to the viewing port 6. The camera 41 of FIG. 4 has the disadvantage when compared with the camera 1 of FIGS. 1 and 2 in that the recorded oscilloscope trace in upside down and left to right of requiring two mirrors and of creating an awkward viewing angle for the observer.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:

1. In an electrophotographic oscilloscope camera, means forming a photoconductive member, means for projecting a photon image of an oscilloscope trace upon said photoconductive member, means for superimposing a projected photon image of a graticule upon the oscilloscope projected trace image on said photoconductive member, means operable for a certain exposure time for producing a charge image pattern on a recording medium in accordance with the superimposed oscilloscope trace and graticule images on said photoconductive member, the improvement wherein, said means for projecting the graticule photon image upon said photoconductive member projects such image with a first intensity during an observation period of time and projects such image with a substantially higher intensity during the certain exposure time.

2. The apparatus of claim 1 wherein said means for superimposing the photon image of the graticule upon the oscilloscope image on said photoconductive member includes a partially optically transmissive mirror.

3. The apparatus of claim 1 wherein said means for projecting the graticule image with the first and second intensities includes a source of light, and means for switching the light intensity of said light source between a first intensity and a second higher intensity.

4. The apparatus of claim 1 including means for positioning a web of electrographic recording medium over said photoconductive member, and means for applying an electrical potential across said photoconductive member and said electrographic recording web during the certain exposure time to cause the electric charge image to be formed on said web of electrographic recording medium.

5. The apparatus of claim 4 wherein said photoconductive member is a plate of photoconductive material.

6. The apparatus of claim 5 wherein said photoconductive material is selenium.

7. The apparttus of claim 3 wherein said light source includes a plurality of lamps, means for energizing a certain number of said lamps to produce the lower light intensity mode of operation during a certain observation time, and switch means for energizing a certain substantially greater number of said lamps during the certain exposure times.

References Cited

UNITED STATES PATENTS 3,111,887   11/1963   Alexander _____ 95—1.1
3,115,075   12/963    Alexander _____ 346—74 X JOSEPH W. HARTARY, Primary Examiner U.S. Cl. X.R.

95—1.1; 346—74